(12) United States Patent
Ducote

(10) Patent No.: US 6,619,220 B1
(45) Date of Patent: Sep. 16, 2003

(54) HYBRID SES/HOVERCRAFT WITH RETRACTABLE SKIRT SYSTEM

(75) Inventor: John E. Ducote, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/132,332

(22) Filed: Apr. 23, 2002

(51) Int. Cl.⁷ .................................................. B63B 1/38
(52) U.S. Cl. ...................... 114/67 A; 180/124; 180/126; 180/128
(58) Field of Search ........................ 114/67 A; 180/116, 180/124, 126, 127, 128

(56) References Cited

U.S. PATENT DOCUMENTS

| 3,330,369 A | * | 7/1967 | Hayward | 81/315 |
| 3,473,503 A | * | 10/1969 | Gunther | 114/67 A |
| 4,696,362 A | * | 9/1987 | Wilson et al. | 180/116 |

\* cited by examiner

*Primary Examiner*—Sherman Basinger
(74) *Attorney, Agent, or Firm*—Donald G. Peck; Harvey A. Gilbert

(57) ABSTRACT

A hybrid craft can operate as a high speed SES in open water and deploy a retracted flexible skirt to operate as a hovercraft across beaches and overland. A downwardly extending boundary structure on a hull periphery reaches through the surface of water. The boundary structure has thin rigid side-walls extending downward from lateral sides, a forward seal wall extending downward from a forward portion, and an aft seal wall extending downward from an aft portion. Machinery creates a pressurized air cushion under the hull inside of the boundary structure to support and transport the hull. A flexible skirt system on said hull inwardly of and adjacent to the boundary structure can be retracted to a first position above the boundary structure and the water and extended to a second position below the boundary structure and the surface of the water to transit beaches and overland on the air cushion.

14 Claims, 5 Drawing Sheets

HYBRID SES/HOVERCRAFT WITH RETRACTABLE SKIRT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to advanced high-speed marine vehicles. More particularly, this invention is to a hybrid SES/hovercraft having a retractable skirt system.

Two primary types of high-speed advanced marine vehicles are the surface effect ship (SES) (or surface effect vehicle (SEV)) and the fully skirted hovercraft. Both are considered air-cushioned vehicles (ACV) in that each rides on a pressurized cushion of air. The air cushion serves to separate the vehicle from the surface over which it operates, allowing freer movement while greatly decreasing the hydrodynamic drag. The lower drag allows much greater speeds to be achieved at lower drive power when compared to conventional displacement hulls. In each case powered lift fans are needed to maintain the flow of volumes of pressurized air under the vehicle due to the flow of air escaping from the cushion.

The air cushion of the hovercraft is contained around its perimeter by a flexible bag and finger skirt system which conforms to the irregular operating surface be it waves or uneven terrain, thereby greatly reducing the flow of air escaping from the cushion. The air cushion of the SES or SEV is contained on the sides by relatively thin, rigid, lateral walls contacting and protruding into the water, and at the front and rear by flexible or semi-flexible seals or skirts. Though the hovercraft skirt theoretically can have a lower drag due to the air gap which would give no interaction with the surface, in reality considerable drag can be experienced in rougher water due to wave interaction with the skirt's fingers. So, the SES will have considerably lower hydrodynamic drag in rougher water due to the thinness and rigidity of the side-walls as opposed to the unwieldy side portion of the skirt of the hovercraft. A further advantage of the SES is that since its side-walls protrude below the water surface there is practically no air loss out the sides. The reduced drag of the SES reduces the thrust required to achieve a given speed, and the reduced air loss reduces the power required for the lift fans. In addition, water-jet or other water propulsion means may be employed with the SES which are generally more efficient than air-propellers on hovercraft. Also, the operational costs of the side-walls on the SES are much lower when compared to the side portions of the skirt of the hovercraft. This is because the side portions of the skirt of the hovercraft are composed of a multitude of components made of flexible materials which are prone to wear and damage and, due to waves, are in constant contact with the water surface while underway. However, despite the advantages of the SES, its rigid side-walls mean that it is strictly a non-amphibious vehicle, and is limited to water-borne operations of suitable depth. In contrast to the SES, the hovercraft is a truly amphibious vehicle with is capable of traversing on dry land as well as open water, and it can also operate effectively on soft mud, marsh, or tidal flats that are impassible to any other vehicle.

Thus, in accordance with this inventive concept, a need has been recognized in the state of the art for a watercraft that can operate as a high speed SES in open water and can deploy a retracted skirt to operate as a hovercraft across beaches and overland.

OBJECTS AND SUMMARY OF THE INVENTION

An object of the invention is to provide a hybrid SES/hovercraft having a retractable skirt.

Another object of the invention is to provide a hybrid SES/hovercraft having lateral rigid thin walls of an SES for high-speed travel across open water and a flexible skirt of a hovercraft for transitioning beaches and overland.

Another object of the invention is to provide a hybrid craft to operate as an SES when in suitably deep water and with the skirt retracted yet will still be capable of full amphibious operations in a hovercraft mode with the skirt deployed.

Another object of the invention is to provide a hybrid craft having a retractable skirt to reduce wear and tear on the skirt that may occur during high-speed transit in open water.

Another object of the invention is to provide an amphibious hybrid craft having a retractable skirt and rigid thin side-walls to reduce air losses and drag and to permit greater speed during high-speed transit in open water.

These and other objects of the invention will become more readily apparent from the ensuing specification when taken in conjunction with the appended claims.

Accordingly, the present invention is to be a hybrid craft. The hybrid craft has a hull having a downwardly extending boundary structure on the periphery of the hull to reach through the surface of water. The boundary structure has thin rigid side-walls extending downward from lateral sides of the hull, a forward seal wall extending downward from a forward portion of the hull, and an aft seal wall extending downward from an aft portion of the hull. Means mounted on the hull creates a pressurized cushion of air under the hull inside of the boundary structure to support and transport the hull on the water on an air cushion. A flexible skirt system is mounted on the hull inwardly of and adjacent to the boundary structure to retract to a first position above the boundary structure the surface of the water and to extend to a second position below the boundary structure and the surface of the water to allow transit across beaches and overland.

DESCRIPTION OF THE PREFERRED EMBODIMENTS

Figure 1:
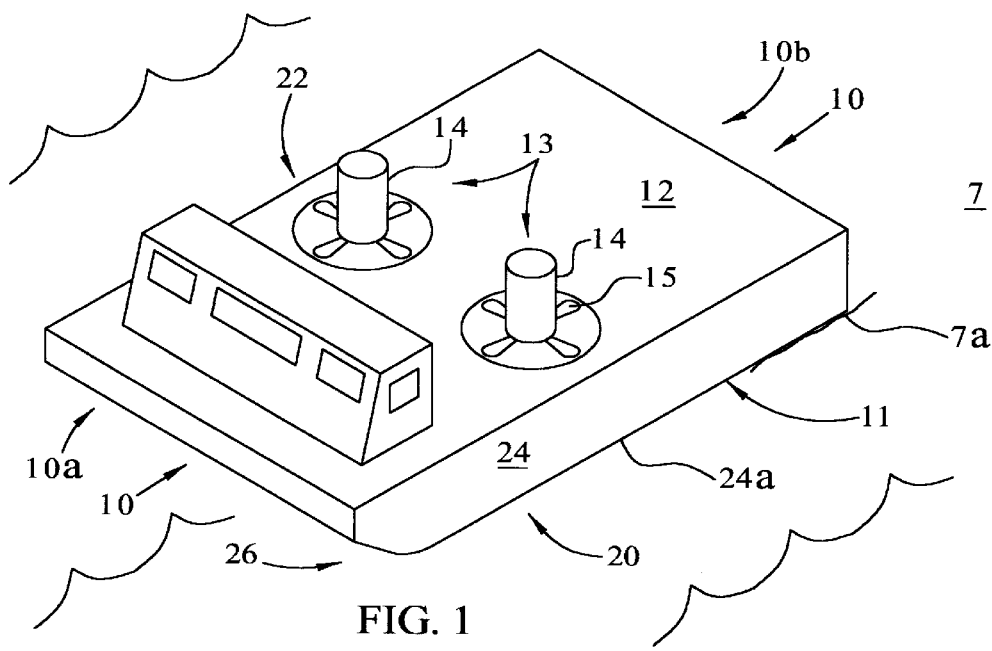
FIG. 1 is an isometric depiction of the hybrid craft of the invention underway across open water in the open water mode.
Figure 2:
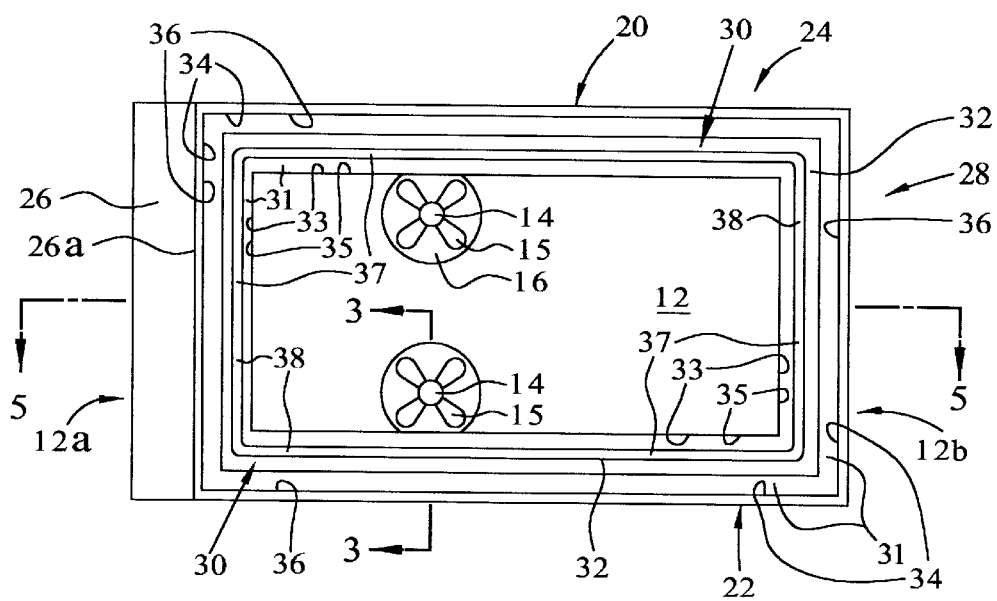
FIG. 2 is a schematic bottom view of the hybrid craft of the invention.
Figure 4:
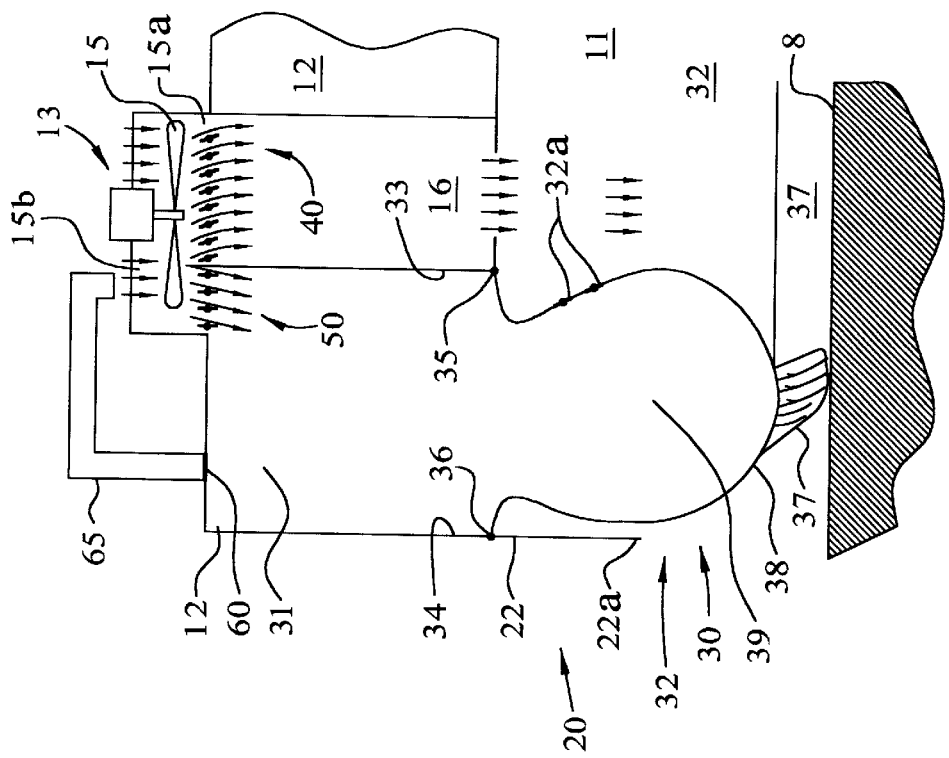
FIG. 4 is a cross-sectional schematic view taken generally along line 3—3 in FIG. 2 showing the skirt deployed inside of and adjacent to one rigid thin side-wall of the hybrid craft to extend below the rigid thin side-wall.

Referring to FIGS. 1 and 2, hybrid craft 10 of the invention is schematically shown traversing open water 7 at high speed on a pressurized cushion of air, or air cushion 11 beneath hull 12 of hybrid craft 10. Similar to contemporary surface effect ships (SES) and hovercraft, air cushion 11 for hybrid craft 10 is generated by machinery 13 carried on-board. Machinery 13 can include an appropriate number of motors, such as gas turbines 14 connected to propeller-like fans 15 that force sufficient volumes of pressurized air through air-flow ducts 16 in hull 12 to create and maintain air cushion 11 for transit, maneuvering, and hovering of hybrid craft 10. Although only two units of gas turbines 14 and fans 15 are schematically shown, it is understood that more such units including their associated components of interconnected machinery 13 can be included and located as needed, and/or units of centrifugal or mixed flow systems can be placed in virtually any arrangement to direct sufficient volumetric flows through air-flow ducts 16 to maintain air cushion 11 and other volumetric and pressure conditions to be described.

In addition, hybrid craft 10 of the invention has boundary structure 20 extending downward from hull 12 to interface and penetrate surface 7a of open water 7 in much the same manner as a conventional SES. Downwardly extending boundary structure 20 of hybrid craft 10 has a pair of thin rigid side-wall portions 22, 24 that each longitudinally extend along substantially the entire length of opposite lateral sides of hull 12. Boundary structure 20 additionally includes a forward seal wall portion 26 that inclines to the rear from bow 10a of hybrid craft 10 and extends across the width of forward portion 12a of hull 12 to become connected to side-wall portions 22, 24. Boundary structure 20 also includes an aft seal portion 28 that inclines to the rear at stern 10b of hybrid craft 10 and extends across the width of aft portion 12b of hull 12 to be connected to side-wall portions 22, 24. Thin rigid side-wall portions 22, 24, forward seal portion 26, and aft seal portion 28 can be made from tough and strong materials appropriately fabricated and connected to hull 12 according to sound marine design criteria to reliably perform and bear the expected loads. Relatively thin metal plates such as steel that may be coated or treated otherwise to be corrosion resistant could be used to fabricate the portions of boundary structure 20 as has been done for years in conventional SES construction.

Unlike a conventional SES, however, hybrid craft 10 of the invention has a flexible skirt system 30 disposed in a rectangular-extending channel 31 in hull 12 that continuously extends inside of and adjacent to portions 22, 24, 26, and 28 of boundary structure 20. A flexible skirt structure 32 of flexible skirt system 30 is secured along its entire rectangular length in rectangular-extending channel 31 to walls 33 and 34. Rectangular-extending channel 31 has an essentially rectangular cross-sectional shape between walls 33 and 34. Flexible skirt structure 32 is secured to walls 33 and 34 along sealed junctions 35 and 36 that continuously extend on walls 33 and 34, inside of and adjacent to portions 22, 24, 26, and 28.

Flexible skirt system 30 has a flexible finger structure 37 secured to bottom-side 38 of flexible skirt structure 32. Flexible finger structure 37 extends along bottom-side 38 the entire rectangular-shaped length of flexible skirt structure 32 to help contain air cushion 11 under hull 12. Flexible skirt structure 32 and flexible finger structure 37 can be made like many other skirt and finger structures currently being utilized in contemporary hovercraft. Flexible skirt structure 32 and flexible finger structure 37 are made from materials having sufficient strength, toughness, and flexibility to undergo the repeated transitions to and from the retracted and extended positions, yet contain air cushion 11 to support hybrid craft 10 when traversing beaches 8 and traveling overland 9.

Referring additionally to FIGS. 3, 4, 5, and 6, rectangular-extending channel 31, flexible skirt structure 32 and sealed junctions 35 and 36 thereby form a rectangular-extending chamber 39 beneath hull 12. Deployment and retraction of flexible skirt structure 31 and flexible finger structure 37 of flexible skirt system 30 changes the dimensions of rectangular-extending chamber 39. Selectively ducting and venting portions of the volumes of pressurized air to and from continuous rectangular-extending chamber 39 in flexible skirt structure 32 effects deployment and retraction of flexible skirt structure 31 and flexible finger structure 37. Motor-driven fans 15 of machinery 13 create sufficient volumes of pressurized air to create and maintain air cushion 11 for support and transport of hull 12 over water and land. Motor-driven fans 15 of machinery 13 also create portions of the volumes of pressurized air that can be selectively fed to continuous rectangular-extending chamber 39 inside of channel 31 and flexible skirt structure 32 to inflate and extend flexible skirt structure 32.

Figure 3:
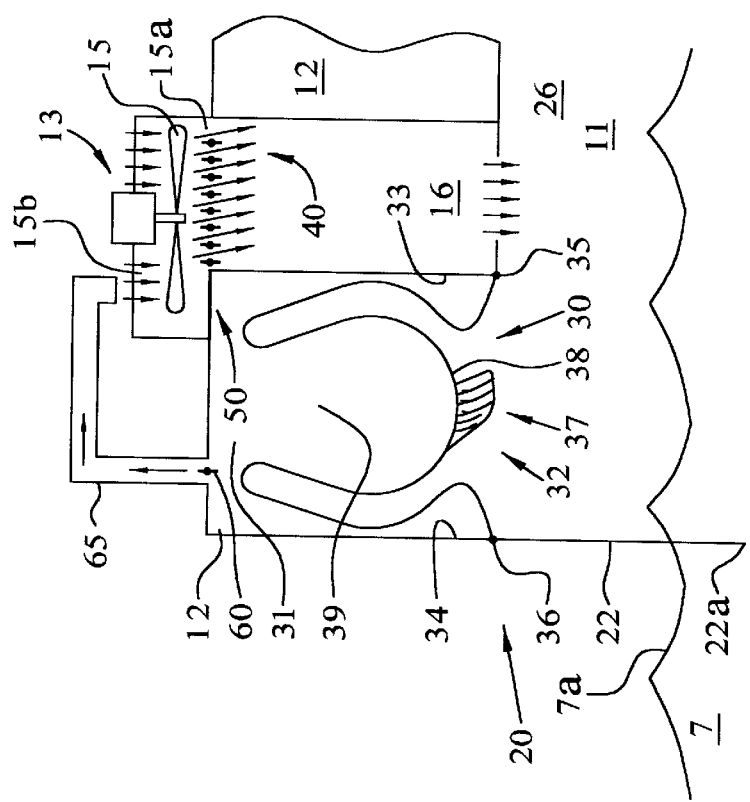
FIG. 3 is a cross-sectional schematic view taken generally along line 3—3 in FIG. 2 showing the skirt retracted inside of and adjacent to one rigid thin side-wall of the hybrid craft.

Several units of machinery 13 are located on hybrid craft 10, and each has a first set of control vanes 40 to direct sufficient volumes of pressurized air from a high pressure side 15a of motor-driven fans 15 of machinery 13 and feed them through air-flow duct 16 to beneath hull 12 to create air cushion 11 that supports and permits transit of hybrid craft 10, see FIG. 3. A second set of control vanes 50 from each unit of machinery 13 can be opened or closed to enable or prevent feeding of a portion of the volumes pressurized air to rectangular-extending chamber 39. Opening second set of control vanes 50 while partially closing first set of control vanes 40 feeds a portion of the volumes of pressurized air into rectangular-extending chamber 39 that is higher in pressure than the pressure in air cushion 11 to extend, or deploy skirt system 30 from channel 31 and below boundary structure 20, see FIG. 4. During this partial closing of first set of control vanes 40, however, sufficient volumes of pressurized air are still passed to beneath hull 12 to maintain air cushion 11 that can support hybrid craft during transport. A third set of control vanes 60 associated with each unit of machinery 13 can be closed to block passage of air or opened to connect chamber 39 to a vacuum duct 65 that extends to a low pressure, or vacuum side 15b of motor-driven fans 15. Opening third set of control vanes 60 couples a vacuum from vacuum side 15b to rectangular-extending chamber 39 and vents pressurized air from rectangular-extending chamber 39 to draw, or retract flexible skirt structure 32 into channel 31 and hold it there when second set of control vanes 50 are virtually simultaneously closed, see FIG. 3. In addition, the positive pressure of air cushion 11 pushes upward on flexible skirt structure 32 to augment, or help the drawing-in of skirt structure 32 into channel 31. Sets of control vanes 40, 50, and 60 can be rotated to either the fully closed or fully open position or some intermediate position, and alternatively can be some type of gate or flapper mechanism depending on the desired degree of extension of flexible skirt system 30.

Figure 5:
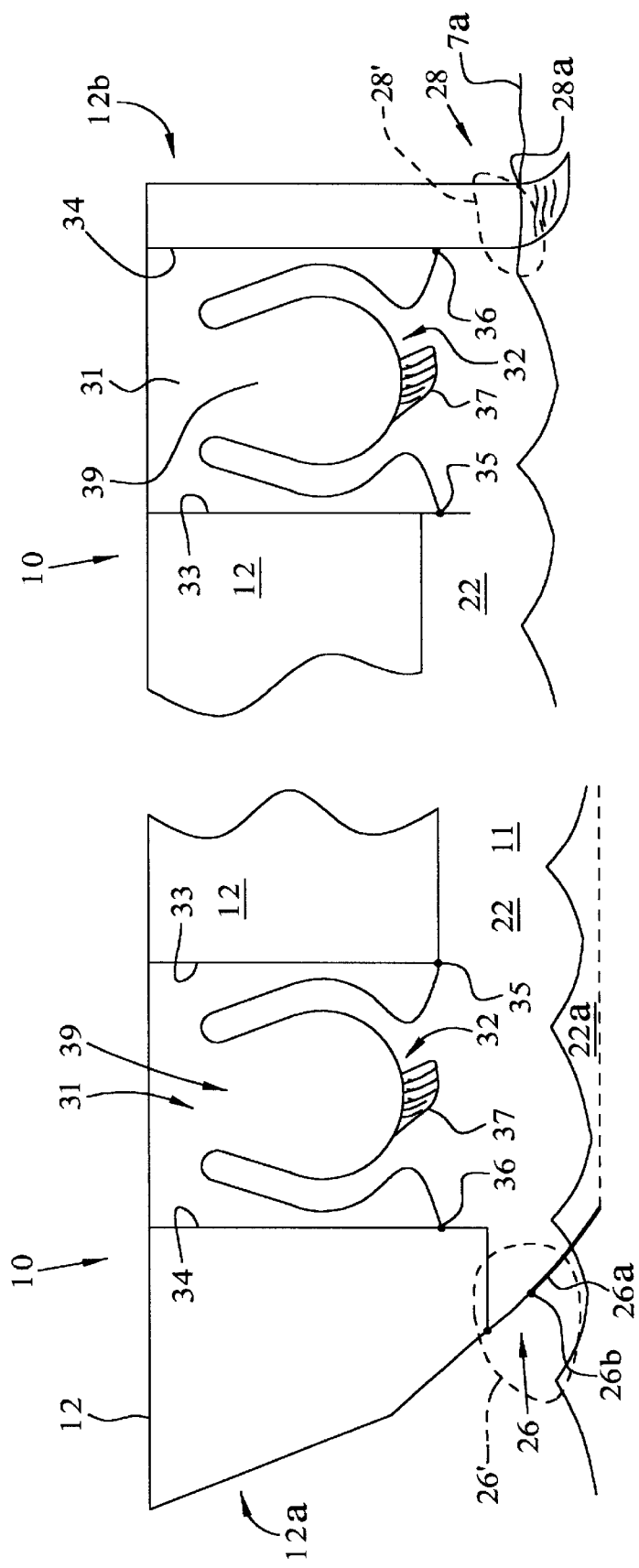
FIG. 5 is a cross-sectional schematic view taken generally along line 5—5 in FIG. 2 showing the skirt retracted inside of and adjacent to the forward and aft seal walls of the hybrid craft.

When operating in the open-water mode of transport, first set of control vanes 40 on hull 12 are rotated to an open position to direct sufficient volumes of pressurized air and feed them through air-flow duct 16 to beneath hull 12 to create air cushion 11 within thin rigid side-walls 22, 24, forward seal wall 26 and aft seal wall 28 of boundary structure 20, see FIGS. 3 and 5. The combination of positive pressure of volumes of pressurized air in air cushion 11 and a vacuum applied via the open third set of control vanes 60 and vacuum duct 65 from low pressure side 15b of fans 15 holds skirt system 30 retracted in channel 31. End sections 22a, 24a, 26a, and 28a of walls 22, 24, 26, and 28 pierce surface 7a of water 7 a short length which is a function of craft weight, geometry, and hydrostatic and hydrodynamic forces. Such factors will be considered in the craft design so that the penetration will be sufficiently long to prevent undue air loss but will be sufficiently short to minimize hydrodynamic drag. Other portions of the volumes of pressurized air or additional motor-driven fans, propellers, pump-jets, etc. (not shown) can be used for propelling hybrid craft 10 across water 7 in accordance with established conventional SES and hovercraft technologies. Since only a relatively short length of rigid end sections 22a, 24a, 26a, and 28a are in water 7, the levels of hydrodynamic drag created as hybrid craft 10 goes across water 7 do not overly interfere with efficient high-speed transit of hybrid craft 10 on water 7.

As a shoreline is approached, hybrid craft can slow or maintain its speed to traverse beaches or land in the overland mode of transport. First set of control vanes 40 are partially closed but not so far as to interfere with maintaining sufficient pressure and volumetric flow to sustain air cushion 11. Virtually simultaneously, second set of control vanes 50 are opened to feed a portion of the volumes of pressurized air at higher pressures than the air pressure in air cushion 11 into rectangular extending chamber 39, and third set of control vanes 60 are closed to block the vacuum in vacuum duct 65 and prevent it from being exposed to rectangular-extending chamber 39. Skirt system 30 is deployed by the higher pressure in rectangular-extending chamber 39 to extend downwardly from hull 12 and below boundary structure 20 to place finger structure 37 and possibly bottom side 38 on beach 8 and/or land 9, see FIG. 6. Optionally, holes or one-way valves 32a may be included in flexible skirt structure 32 to control the ratio of pressure of internal skirt structure 32 to the pressure of air cushion 11. Sets of control vanes 40, 50, and 60 are rotated, or otherwise displaced by interconnected controlled actuators, such as electric motor or hydraulic systems that are well known in the art and not shown in the drawings to avoid belaboring the obvious.

Figure 6:
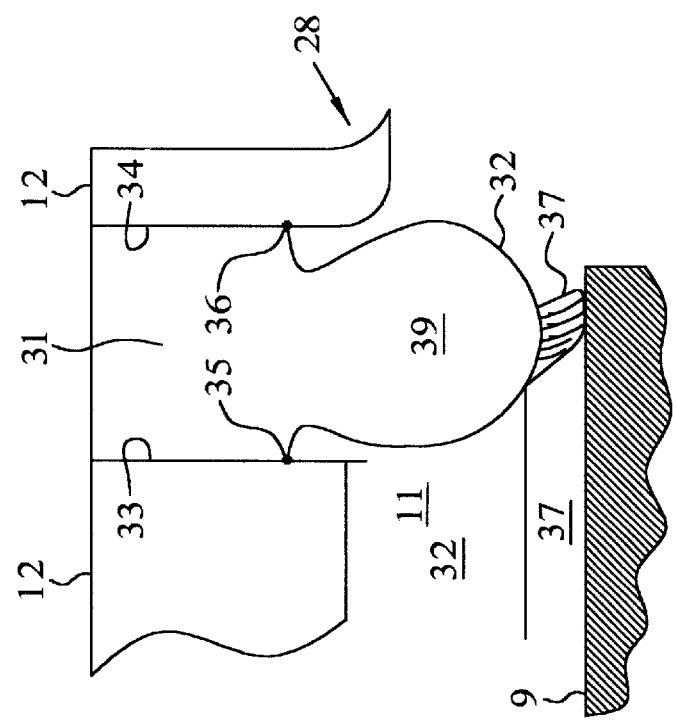
FIG. 6 is a cross-sectional schematic view taken generally along line 5—5 in FIG. 2 showing the skirt deployed inside of and adjacent to the forward and aft seal walls of the hybrid craft to extend below the forward and aft seal walls.
Figure 6:
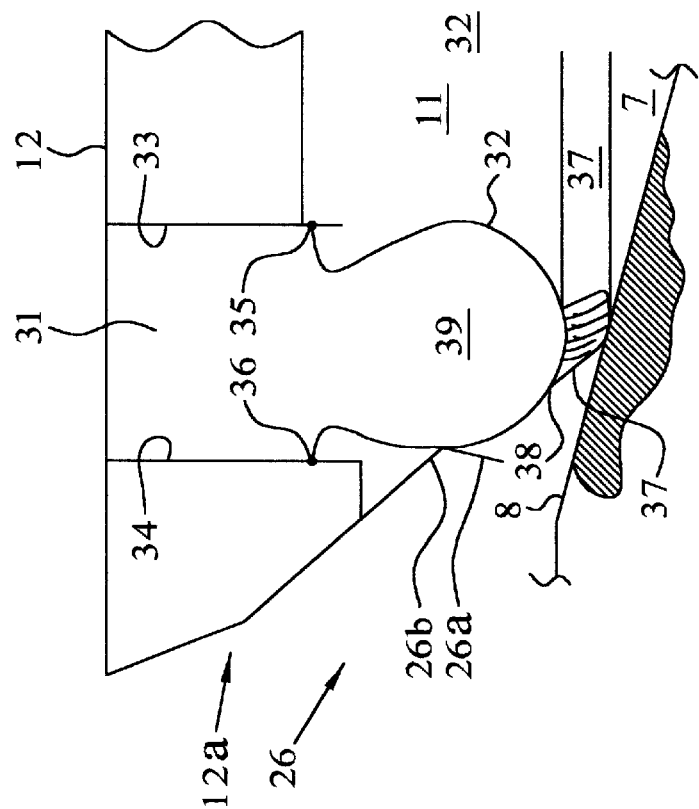

End section 26a and seal wall 26 may be joined together by a hinge-like coupling 26b to allow end section 26a to at least partially rotate and allow skirt system 30 to inflate and extend downwardly past boundary structure 20, see FIG. 6. This feature avoids creation of undue stresses and reduces frictional interactions between end section 26a and flexible skirt structure 32 and flexible finger structure 37. Optionally, forward seal wall 26 and aft seal wall 28 can be made from one rigid piece of material, such as steel plate, or can be a plurality of rigid or flexible strips arranged in a side-by-side relationship to extend across front and aft portions 12a and 12b of hull 12. These configurations may or may not have hinged end sections as desired. When strips are used, they may have to have sealing members between them or be overlapping with respect to one another to provide enough structural integrity and sealing to contain air cushion 11 under hull 12.

Another option for hybrid watercraft is to have flexible bag seal wall structure 26' and 28' extending across front and aft portions 12a, 12b, respectively, to function as forward seal wall 26 and aft seal wall 28 instead of rigid plates or rigid/flexible strips. Flexible bag seal wall structures 26', 28' (as shown by phantom lines in FIG. 5) can be fabricated similarly to flexible skirt structure 32. Flexible bag structures 26', 28' are separate from flexible skirt structure 32 that extends below flexible seal wall structures 26', 28' when flexible skirt structure 32 is inflated and deployed. Yet another option is that flexible skirt structure 32 may be only partially inflated, as shown by the phantom lines in FIG. 5, and consequently, be only partially deployed to function as forward seal wall 26 and aft seal wall 28. Partial inflation and deployment of flexible skirt structure 32 can be accomplished by proper actuation of control vanes 40, 50, and 60 and ducting of volumes of pressurized air to chamber 39 in flexible skirt structure 32. Still another option is to locate skirt system 30 outside of boundary structure 20 to provide better access to the components of skirt system 30 for maintenance, but this may unduly expose skirt system 30 to the possibility of damage from external sources.

Irrespective which configuration for the forward and aft seal walls is selected (forward and aft seal walls 26, 28, flexible bag seal wall structures 26', 28', partially inflated flexible bag structure 32), the forward and aft seal walls are located somewhat higher than end sections 22a and 24a of side-walls 22, 24 so that end sections 22a, 24a will be immersed in water 7 so that no part of air cushion 11 is lost out the sides.

Figure 7:
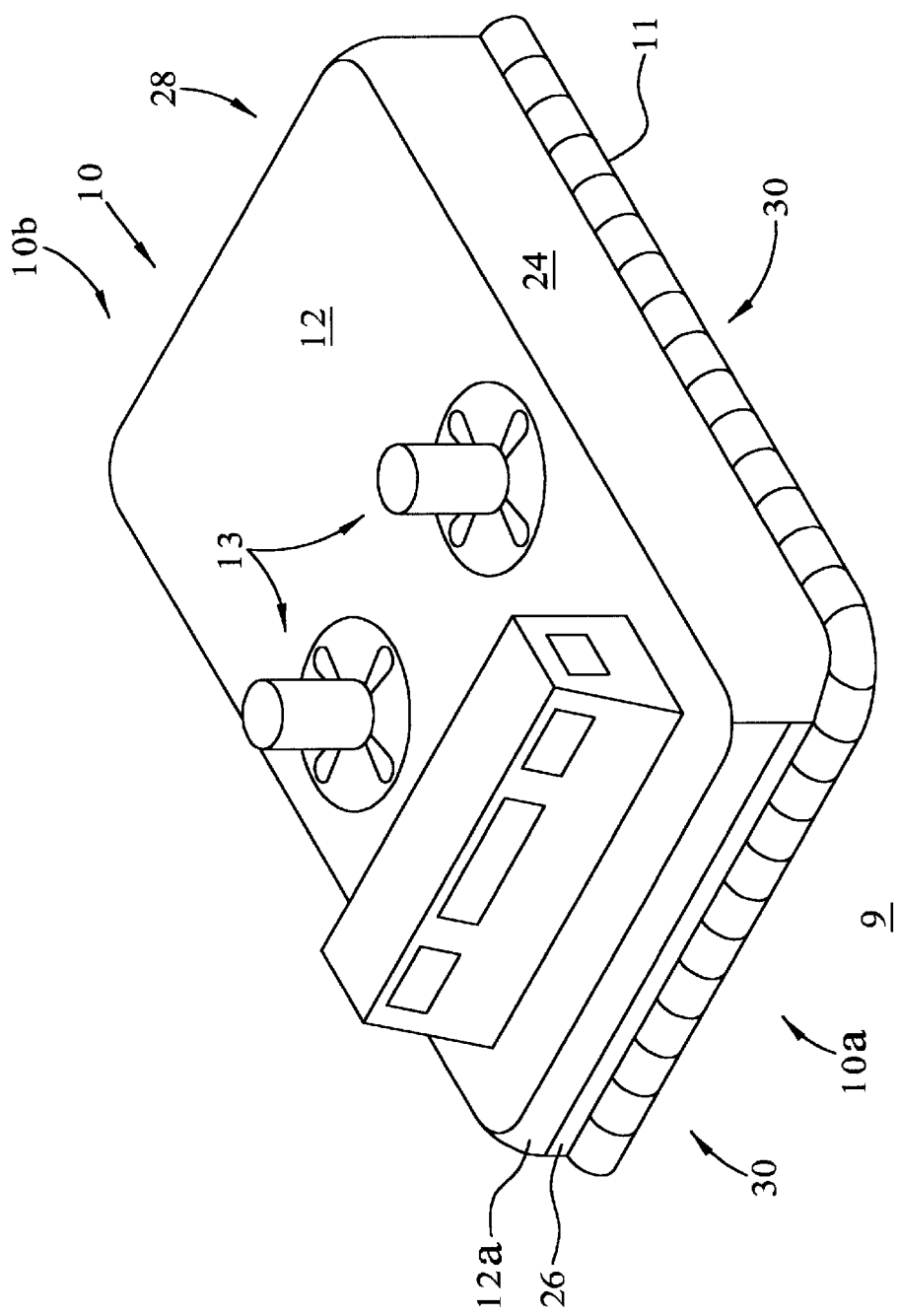
FIG. 7 is an isometric depiction of the hybrid craft of the invention underway across land in the overland mode.

When flexible skirt structure 32 is fully inflated and deployed and air cushion 11 is created under hull 12, all of side-walls 22, 24 are lifted out of water 7 along with the rigid/or flexible structure of forward and aft seal walls 26, 28 or flexible bags 26', 28'. Hybrid craft 10 can operate over land 9 in the hovercraft mode, see FIG. 7. FIG. 6 depicts flexible skirt structure 32 and flexible finger structure 37 of flexible skirt system 30 at forward portion 12a of hull 12 accommodating the inclined surface of beach 8 (or any other inclined surface on land) as hybrid craft 10 begins to traverse this feature of terrain in the hovercraft mode. Also note that flexible skirt structure 32 and flexible finger structure 37 of flexible skirt system 30 at aft portion 12b of hull 12 accommodates the flat surface overland 9 as hybrid craft 10 traverses this feature of terrain in the hovercraft mode. Flexible skirt system 30 maintains air cushion 11 under hull 12.

Having the teachings of this invention in mind, modifications and alternate embodiments of hybrid watercraft 10 may be adapted without departing from the scope of the invention. Its uncomplicated, compact design that incorporates structures long proven to operate successfully lends itself to numerous modifications to permit its reliable use in hostile and demanding marine environments both on open water and over many different types of land mass, including but not limited to beaches, hard-pack, soft mud, marsh, tidal flats etc. Hybrid craft 10 can be made larger or smaller in different shapes and fabricated from a wide variety of materials to assure resistance to corrosion, sufficient strength for heavy loads, and long term reliable operation under a multitude of different operational requirements.

The disclosed components and their arrangements as disclosed herein, all contribute to the novel features of this invention. Hybrid craft 10 provides a multipurpose and capable means of rapidly transporting personnel and materials to assure completion of assigned tasks irrespective of ambient conditions and terrain associated with hostile marine and land environments. Therefore, hybrid craft 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A hybrid craft comprising:

a hull having a downwardly extending boundary structure on the periphery of said hull to reach through the surface of water, said boundary structure having a forward seal wall portion extending downward from a forward portion of said hull, an aft seal wall portion extending downward from an aft portion of said hull, and only a single thin rigid side-wall extending downward from each lateral side of said hull between said forward seal wall portion and said aft seal wall portion;

means mounted on said hull for creating a pressurized cushion of air under said hull inside of said boundary structure to support and transport said hull on an air cushion; and a flexible skirt system mounted on said hull inwardly of and adjacent to said boundary structure to retract to a first position above said boundary structure and said surface of said water and to extend to a second position downwardly extending below said boundary structure and said surface of said water.

2. The craft of claim 1 further comprising:

first means mounted on said hull for feeding volumes of pressurized air to beneath said hull and inside of said boundary structure to support and transport said hull on said air cushion.

3. The craft of claim 2 further comprising:

second means mounted on said hull for feeding a portion of said volumes of pressurized air to a chamber in said flexible skirt system to deploy said flexible skirt system from said retracted first position to said downwardly extending second position below said boundary structure.

4. The craft of claim 3 wherein said air cushion is under said hull and inside of said flexible skirt system when said flexible skirt system is deployed to said downwardly extending second position to support and transport said hull on said air cushion.

5. A hybrid craft comprising:

a hull having a downwardly extending boundary structure on the periphery of said hull to reach through the surface of water, said boundary structure having thin rigid side-wall portions extending downward from lateral sides of said hull, a forward seal wall portion extending downward from a forward portion of said hull, and an aft seal wall portion extending downward from an aft portion of said hull;

means mounted on said hull for creating a pressurized cushion of air under said hull inside of said boundary structure to support and transport said hull on an air cushion;

a flexible skirt system mounted on said hull inwardly of and adjacent to said boundary structure to retract to a first position above said boundary structure and said surface of said water and to extend to a second position downwardly extending below said boundary structure and said surface of said water;

first means mounted on said hull for feeding volumes of pressurized air to beneath said hull and inside of said boundary structure to support and transport said hull on said air cushion;

second means mounted on said hull for feeding a portion of said volumes of pressurized air to a chamber of in said flexible skirt system to deploy said flexible skirt system from said retracted first position to said downwardly extending second position below said boundary structure, said air cushion being under said hull and inside of said flexible skirt system when deploying said flexible skirt system to said downwardly extending second position to support and transport said hull on said air cushion; and means mounted on said hull for venting pressurized air from said chamber in said flexible skirt system to retract said flexible skirt system from said downwardly extending second position to said retracted first position above said boundary structure.

6. The craft of claim 5 wherein positive pressure from said volumes of pressurized air from said first pressurized air feeding means pushes against said flexible skirt system to help retract said flexible skirt system to said retracted position above said boundary structure.

7. The craft of claim 6 wherein said chamber is shaped as a rectangular-extending channel continuously extending inside of and adjacent to said thin rigid side-wall portions, said forward seal wall portion, and said aft seal wall portion, and said flexible skirt system continuously extends in said rectangular-extending channel.

8. The craft of claim 7 wherein said flexible skirt system is comprised of a flexible skirt structure having a flexible finger structure on a bottom side of said flexible skirt structure.

9. The craft of claim 8 wherein said flexible skirt structure is connected to walls of said rectangular-extending channel to form a said rectangular-extending chamber therein.

10. The craft of claim 9 wherein said pressurized air cushion creating means includes motor-driven lift fans drawing in ambient air to create said pressurized cushion of air under said hull.

11. The craft of claim 10 and said first and second feeding means has first and second sets of control vanes to feed portions of volumes of pressurized air into said chamber to deploy said flexible skirt.

12. The craft of claim 11 wherein said venting means has a third set of control vanes and at least one vacuum duct to couple to low pressure sides of said lift fans to vent a portion of volumes of pressurized air from said rectangular-extending chamber to retract said flexible skirt.

13. The craft of claim 12 wherein said first and second sets of control vanes of said first and second feeding means are adjustable to selectively change the flow of volumes of pressurized air to said rectangular-extending chamber in said flexible skirt.

14. The craft of claim 13 wherein said third set of control vanes of said venting means are adjustable to selectively change the flow of volumes of pressurized air in said vacuum ducts.

* * * * *